US012795595B2

(12) United States Patent
Goyal et al.

(10) Patent No.: US 12,795,595 B2
(45) Date of Patent: Nov. 10, 2026

(54) PREDICTING LOCATION OF UE IN WIRELESS COMMUNICATION NETWORK

(71) Applicant: Rakuten Symphony, Inc., Tokyo (JP)

(72) Inventors: Rajesh Kumar Goyal, Indore (IN); Shashank Misra, Indore (IN); Ranjeet Patro, Indore (IN); Mudit Goel, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 654 days.

(21) Appl. No.: 18/023,444

(22) PCT Filed: Feb. 2, 2023

(86) PCT No.: PCT/US2023/012176

§ 371 (c)(1),
(2) Date: Feb. 27, 2023

(87) PCT Pub. No.: WO2024/136910

PCT Pub. Date: Jun. 27, 2024

(65) Prior Publication Data

US 2025/0081153 A1 Mar. 6, 2025

(30) Foreign Application Priority Data

Dec. 21, 2022 (IN) ............................ 202221074231

(51) Int. Cl.
*H04W 64/00* (2009.01)
*H04W 4/02* (2018.01)

(52) U.S. Cl.
CPC .......... *H04W 64/003* (2013.01); *H04W 4/02* (2013.01)

(58) Field of Classification Search
CPC . H04L 41/0894; H04L 67/51; H04L 43/0864; H04L 41/14; H04L 41/16;
(Continued)

(56) References Cited

U.S. PATENT DOCUMENTS

2020/0314719 A1* 10/2020 Tofighbakhsh ....... H04W 36/04
2022/0256315 A1* 8/2022 Lei .................... H04W 72/1263
(Continued)

OTHER PUBLICATIONS

International Search Report issued Jun. 30, 2023 in International Application No. PCT/US23/12176.
(Continued)

*Primary Examiner* — Umair Ahsan
(74) *Attorney, Agent, or Firm* — Sughrue Mion, PLLC

(57) ABSTRACT

Embodiments are directed to a method for predicting a location of user equipment (UE) (500) in a wireless communication network. The method includes receiving, by a Near-Real time RAN Intelligent Controller (Near RT RIC) (100), collated UE measurements associated with the UE (500), from an access node (1000) over an E2 interface. The collated UE measurements is determined based on a plurality of UE measurements associated with the UE (500) sent by at least three transmission receipt points (TRPs) (600*a-c*) to the access node (1000). The method also includes inputting, by the Near RT RIC (100), the collated UE measurements to a location prediction model (184) located at the Near RT RIC (100); and predicting, by the Near RT RIC (100), a location of the UE (500) by the location prediction model (184) based on the collated UE measurements.

13 Claims, 9 Drawing Sheets

(58) Field of Classification Search
CPC ... H04L 43/08; H04L 41/0893; H04L 41/149; H04L 43/20; H04W 28/12; H04W 28/10; H04W 64/003; H04W 4/02; H04W 88/12; H04W 24/10; G01S 5/02213; G01S 5/0278; G01S 5/0081; G06N 20/00
See application file for complete search history.

(56) References Cited

U.S. PATENT DOCUMENTS

| | | | | |
|---|---|---|---|---|
| 2022/0353691 | A1 | 11/2022 | Mvanco et al. | |
| 2023/0003826 | A1* | 1/2023 | Parker | G01S 5/0205 |
| 2023/0284178 | A1* | 9/2023 | Parker | G01S 5/01 455/456.1 |
| 2024/0259879 | A1* | 8/2024 | Ranganath | G06N 5/01 |
| 2025/0089007 | A1* | 3/2025 | Huang | H04W 24/10 |

OTHER PUBLICATIONS

Written Opinion issued Jun. 30, 2023 in International Application No. PCT/US23/12176.

* cited by examiner (Contd)

PREDICTING LOCATION OF UE IN WIRELESS COMMUNICATION NETWORK

CROSS-REFERENCE TO RELATED APPLICATION

This application is a National Stage of International Application No. PCT/US2023/012176 filed Feb. 2, 2023, and claims priority to Indian Provisional Application No. 202221074231, filed on Dec. 21, 2022, the disclosure of which is incorporated herein by reference in its entirety.

FIELD OF INVENTION

The present disclosure relates to wireless communication network, and more specifically related to a method and Near-Real time RAN Intelligent Controller (Near RT RIC) for predicting location of UE in wireless communication network.

BACKGROUND

In general, mobile communication systems can utilize location information of a subscriber for multiple uses such as for example but not limited location aware services—which may be directed towards for example advertisements, emergency services such as for example 911 responses which requires accurate location information and law enforcement to track specific subscribers.

However, all the above mentioned use cases leverage a 3GPP defined entity called SMLC (Serving Mobile Location Centre). The methods that are used to figure out subscriber location may use methods such as Observed Time Difference Of Arrival (OTDA), Global navigation satellite system (GNSS), or Experience Cloud Visitor ID (ECID) etc. Here, the location is detected and conveyed to a central node where the location can be accessed by location aware services. This location information however is not transparent to access node such as for example gNodeB or eNodeB. Therefore, the access node does not have access to the UE location information even though the information passes through the access node.

In case the access node is provided access to the location information of the UE, the access node may utilize the location information of the UE for various purposes such as for example:

- Location aware MU-MIMO user paring—In multi-user MIMO UEs that are spatially apart are at times the best candidates to be scheduled in the same timeslot. This is because two independent beams which are spatially apart (in different directions) would not interfere (at least in LOS case)
- Location aware Handover decisions—Currently access node can take handover decisions based on either signal strength or signal quality as measured and reported by the UE. However, if the access node as location information of the UE, then it can take that factor into the Handover decision.
- Location aware scheduling—Users that are at cell edge can cause and also suffer from more interference from neighbouring cells. This can be avoided by utilizing soft frequency reuse like scheme where cell edge users are scheduled on different set of Radio resources than the neighbouring cell's edge users.

Thus, it is desired to at least provide a mechanism for auto focus that is devoid of the above issues.

OBJECT OF INVENTION

The principal object of the embodiments herein is to provide a method and Near-Real time RAN Intelligent Controller (Near RT RIC) for predicting location of UE in wireless communication network. The proposed method uses SRS sent by UE to multiple TRPs to estimate the location of the UE. As a result, the location of the UE is available to an access node which can utilize the location of the UE for various purposes. In the existing mechanism though the location information of the UE passed through the access node, the access node did not have access to the same. As a result, the access node could not perform various actions related to the location of the UE. The proposed method solves the existing constraint.

SUMMARY

Accordingly, embodiments herein disclose a method for predicting a location of user equipment (UE) in a wireless communication network. The method includes receiving, by a Near-Real time RAN Intelligent Controller (Near RT RIC), collated UE measurements associated with a UE, from an access node over an E2 interface, where the collated UE measurements is determined based on a plurality of UE measurements associated with the UE sent by multiple transmission receipt points (TRPs) to the access node. The method also includes inputting, by the Near RT RIC, the collated UE measurements to a trained location prediction model located at the Near RT RIC; and predicting, by the Near RT RIC, a location of the UE by the location prediction model based on the collated UE measurements.

In an embodiment, predicting the location of the UE by the location prediction model based on the collated UE measurements comprises predicting at least one of a distance from each TRP of at least three TRPs and predicting an angle of reception of the SRS at each TRP of at least three TRPs.

In an embodiment, receiving, by the Near RT RIC, the collated UE measurements associated with the UE, from the access node over the E2 interface includes receiving, by each TRP of at least three TRPs, sounding reference signal (SRS) from the UE and determining, by each TRP of the at least three TRPs, the UE measurements comprising at least a time of reception of the SRS from the UE. The method also includes sending, by each TRP of the at least three TRPs, the UE measurements to the access node, receiving, by the access node, the UE measurements sent by each TRP of the at least three TRPs and determining, by the access node, the collated UE measurements associated with the UE using the received UE measurements. Further, the method includes sending, by the access node, the collated UE measurements associated with the UE to the Near RT RIC over the E2 interface; and receiving, by the Near RT RIC, the collated UE measurements associated with the UE from the access node.

In an embodiment, the training of the location prediction model located at the Near RT RIC is performed by Non-Real time RIC associated with the wireless communication network.

In an embodiment, the trained location prediction model is performed by Non-Real time RIC is trained by receiving, by the Non-Real time RIC, observed time difference of arrival (OTDOA) measurements indicating an exact location of the UE from an Enhanced Serving Mobile Location Centre (E-SMLC) periodically. The method also includes receiving, by the Non-Real time RIC, collated UE measurements associated with a plurality of UEs from the Near RT RIC over A1 interface periodically; and training, by the Non-Real time RIC, the location prediction model based on the OTDOA measurements received from the E-SMLC and the collated UE measurements associated with the plurality of UEs from the Near RT RIC.

In an embodiment, the method also includes deploying, by the Non-Real time RIC, the trained location prediction model at the Near RT RIC over the A1 interface.

In an embodiment, the method also includes determining, by the Near RT RIC, at least one of a policy for the UE and a configuration for the UE based on location information of the UEs over the E2 interface.

Accordingly, embodiments herein disclose a Near-Real time RAN Intelligent Controller (Near RT RIC) for predicting a location of user equipment (UE) in a wireless communication network. The Near RT RIC includes a memory, a processor, a communicator and a location management controller. The location management controller is configured to receive collated UE measurements associated with a UE, from an access node over an E2 interface, where the collated UE measurements is determined based on a plurality of UE measurements associated with the UE sent by multiple transmission receipt points (TRPs) to the access node. The location management controller is also configured to input the collated UE measurements to a trained location prediction model located at the Near RT RIC; and predict a location of the UE by the location prediction model based on the collated UE measurements.

Accordingly, embodiments herein disclose a Non-Real time RAN Intelligent Controller (Non RT RIC) for training a location prediction model in a wireless communication network. The Non RT RIC includes a memory, a processor, a communicator and a location prediction model training controller. The location prediction model training controller is configured to receive observed time difference of arrival (OTDOA) measurements indicating an exact location of a UE from an Enhanced Serving Mobile Location Centre (E-SMLC) periodically. Further, the location prediction model training controller is also configured to receive collated UE measurements associated with a plurality of UEs from a Near RT RIC over A1 interface periodically; and train a location prediction model based on the OTDOA measurements received from the E-SMLC and the collated UE measurements associated with the plurality of UEs from the Near RT RIC.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
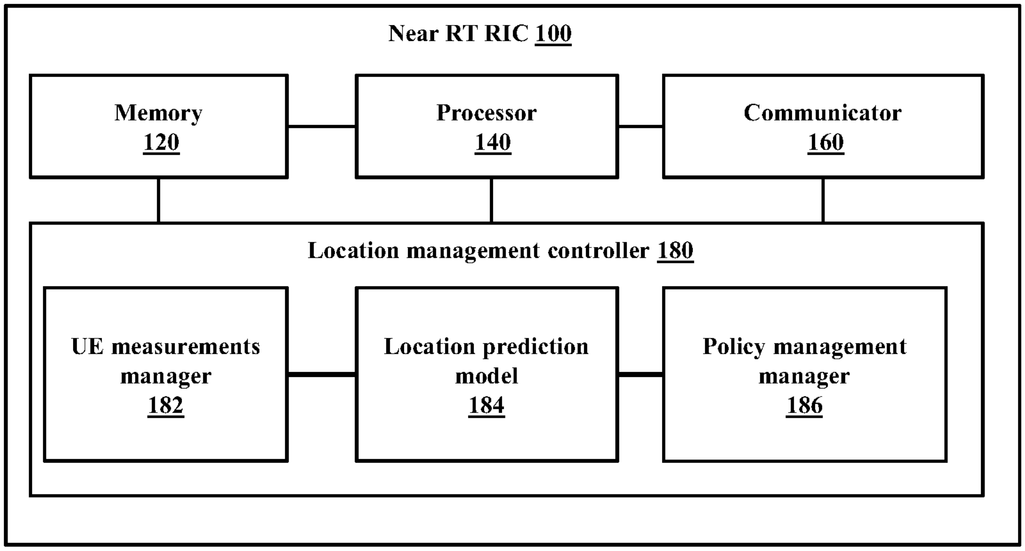
FIG. 1 illustrates a block diagram of a Near RT RIC for predicting a location of a UE in a wireless communication network, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein disclose a method for predicting a location of user equipment (UE) in a wireless communication network. The method includes receiving, by a Near-Real time RAN Intelligent Controller (Near RT RIC), collated UE measurements associated with a UE, from an access node over an E2 interface, where the collated UE measurements is determined based on a plurality of UE measurements associated with the UE sent by multiple transmission receipt points (TRPs) to the access node. The method also includes inputting, by the Near RT RIC, the collated UE measurements to a trained location prediction model located at the Near RT RIC; and predicting, by the Near RT RIC, a location of the UE by the location prediction model based on the collated UE measurements.

Accordingly, embodiments herein disclose a Near-Real time RAN Intelligent Controller (Near RT RIC) for predicting a location of user equipment (UE) in a wireless communication network. The Near RT RIC includes a memory, a processor, a communicator and a location management controller. The location management controller is configured to receive collated UE measurements associated with a UE, from an access node over an E2 interface, where the collated UE measurements is determined based on a plurality of UE measurements associated with the UE sent by multiple transmission receipt points (TRPs) to the access node. The location management controller is also configured to input the collated UE measurements to a trained location prediction model located at the Near RT RIC; and predict a location of the UE by the location prediction model based on the collated UE measurements.

Accordingly, embodiments herein disclose a Non-Real time RAN Intelligent Controller (Non RT RIC) for training a location prediction model in a wireless communication network. The Non RT RIC includes a memory, a processor, a communicator and a location prediction model training controller. The location prediction model training controller is configured to receive observed time difference of arrival (OTDOA) measurements indicating an exact location of a UE from an Enhanced Serving Mobile Location Centre (E-SMLC) periodically. Further, the location prediction model training controller is also configured to receive collated UE measurements associated with a plurality of UEs from a Near RT RIC over A1 interface periodically; and train a location prediction model based on the OTDOA measurements received from the E-SMLC and the collated UE measurements associated with the plurality of UEs from the Near RT RIC.

In the conventional methods and systems, the UE location information passes through the access node such as for example gNodeB or eNodeB. However, the access node does not have access to the UE location information. As a result, the access node may not be able to perform multiple actions which would have been possible had the access node had access to the UE location.

Unlike to the conventional methods and system, the proposed method includes using SRS sent by UEs to multiple TRPs to determine a time of reception of the SRS and then use collated UE measurements by the Near RT RIC to predict the location of the UE based on machine learning techniques.

Unlike to the conventional methods and system, in the proposed method a machine learning model at the Near RT RIC is continuously updated to be able to accurately predict the UE location. Here, the Non RT RIC trains and deploys the M1 models at the Near RT RIC.

Unlike to the conventional methods and system, the proposed method does not make any changes to the existing architecture and simply uses the SRS sent by UE and the ML models at the Near RT RIC to determine the UE location. Therefore, the proposed method is simple and cost effective.

Referring now to the drawings, and more particularly to FIGS. 1 through 7, where similar reference characters denote corresponding features consistently throughout the figures, there are shown preferred embodiments.

FIG. 1 illustrates a block diagram of a Near RT RIC (100) for predicting a location of a UE (500) in a wireless communication network, according to an embodiment as disclosed herein.

In an embodiment, the Near RT RIC (100) includes a memory (120), a processor (140), a communicator (160) and a location management controller (180).

The memory (120) is configured to store instructions to be executed by the processor (140). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information. In certain examples, a non-transitory storage medium may store data that can, over time, change (e.g., in Random Access Memory (RAM) or cache).

The processor (140) communicates with the memory (120), the communicator (160) and the location management controller (180). The processor (140) is configured to execute instructions stored in the memory (120) and to perform various processes. The processor may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (160) includes an electronic circuit specific to a standard that enables wired or wireless communication. The communicator (160) is configured to communicate internally between internal hardware components of the Near RT RIC (100) and with external devices via one or more networks.

The location management controller (180) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors.

The location management controller (180) includes UE measurements manager (182), a location prediction model (184) and a policy management manager (186).

In an embodiment, the UE measurements manager (182) is configured to receive collated UE measurements associated with the UE (500) from an access node (1000) over an E2 interface and input the collated UE measurements to the location prediction model (184) located at the Near RT RIC (100). The collated UE measurements is determined based on a plurality of UE measurements associated with the UE (500) sent by at least three transmission receipt points (TRPs) (600*a-c*) to the access node (1000). The UE measurements is determined by each TRP of the at least three TRPs (600*a-c*) based on sounding reference signal (SRS) received from the UE (500) at each TRP of the at least three TRPs (600*a-c*). The collated UE measurements associated with the UE (500) is generated by the access node (1000) using UE measurements sent by each TRP of the at least three TRPs (600*a-c*) connected to the UE (500) and wherein the UE measurements comprises at least a time of reception of the SRS from the UE (500).

In an embodiment, the location prediction model (184) is configured to receive the collated UE measurements and apply machine learning techniques to predict a location of the UE (500) based on the collated UE measurements. The location prediction model (184) trained and deployed at the Near RT RIC (100) by a Non RT RIC (200). The prediction includes predicting at least one of a distance from each TRP of the at least three TRPs (600*a-c*) and predicting an angle of reception of the SRS at each TRP of the at least three TRPs (600*a-c*).

In an embodiment, the policy management manager (186) is configured to determine at least one of a policy for the UE (500) and a configuration for the UE (500) based on the predicted location information of the UEs over the E2 interface.

At least one of the plurality of modules/components of the location management controller (180) may be implemented through an AI model. A function associated with the AI model may be performed through memory (120) and the processor (140). The one or a plurality of processors controls the processing of the input data in accordance with a predefined operating rule or the AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

Although the FIG. 1 shows various hardware components of the Near RT RIC (100) but it is to be understood that other embodiments are not limited thereon. In other embodiments, the wearable device (100) may include less or more number of components. Further, the labels or names of the components are used only for illustrative purpose and does not limit the scope of the invention. One or more components can be combined together to perform same or substantially similar function in the Near RT RIC (100).

Figure 2:
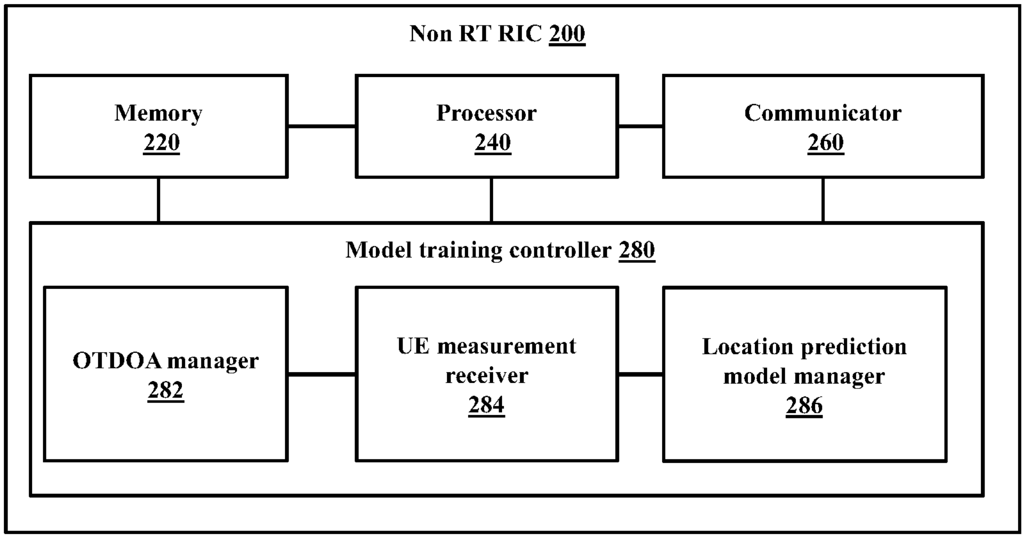
FIG. 2 is a block diagram of a Non RT RIC for training the location prediction model in the wireless communication network, according to an embodiment as disclosed herein.

FIG. 2 is a block diagram of the Non RT RIC (200) for training the location prediction model (184) in the wireless communication network, according to an embodiment as disclosed herein.

The Non RT RIC (200) in an embodiment includes a memory (220), a processor (240), a communicator (260), and a model training controller (280).

The memory (220) is configured to store instructions to be executed by the processor (240). The memory (220) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (220) may, in some examples, be considered a non-transitory storage medium. The term "non-transitory" may indicate that the storage medium is not embodied in a carrier wave or a propagated signal. However, the term "non-transitory" should not be interpreted that the memory (220) is non-movable. In some examples, the memory (220) can be configured to store larger amounts of information. In certain examples, a non-transitory storage medium may store data that can, over time, change (e.g., in Random Access Memory (RAM) or cache).

The processor (240) communicates with the memory (220), the communicator (260) and the model training controller (280). The processor (240) is configured to execute instructions stored in the memory (220) and to perform various processes. The processor may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (260) includes an electronic circuit specific to a standard that enables wired or wireless communication. The communicator (260) is configured to communicate internally between internal hardware components of the Non RT RIC (200) and with external devices via one or more networks.

The model training controller (280) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors.

In an embodiment, the model training controller (280) includes an observed time difference of arrival (OTDOA) manager (282), a UE measurement receiver (284) and a location prediction model manager (286).

In an embodiment, the OTDOA manager (282) is configured to instruct an Enhanced Serving Mobile Location Centre (E-SMLC) (2000) and receive OTDOA measurements indicating an exact location of the UE (500) from the E-SMLC (2000) periodically.

In an embodiment, the UE measurement receiver (284) is configured to receive collated UE measurements associated with a plurality of UEs (500*a*-N) from the Near RT RIC (100) over A1 interface periodically.

In an embodiment, the location prediction model manager (286) is configured to train the location prediction model (184) based on the OTDOA measurements received from the E-SMLC (2000) and the collated UE measurements associated with the plurality of UEs (500*a*-N) from the Near RT RIC (100). The location prediction model manager (286) is configured to deploy the trained location prediction model (184) at the Near RT RIC (100) over the A1 interface to predict the location of the UE (500) by the location prediction model (184) based on the collated UE measurements.

At least one of the plurality of modules/components of the model training controller (280) may be implemented through an AI model. A function associated with the AI model may be performed through memory (220) and the processor (240). The one or a plurality of processors controls the processing of the input data in accordance with a predefined operating rule or the AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

Although the FIG. 2 shows various hardware components of the Non RT RIC (200) but it is to be understood that other embodiments are not limited thereon. In other embodiments, the Non RT RIC (200) may include less or more number of components. Further, the labels or names of the components are used only for illustrative purpose and does not limit the scope of the invention. One or more components can be combined together to perform same or substantially similar function in the Non RT RIC (200).

Figure 3:
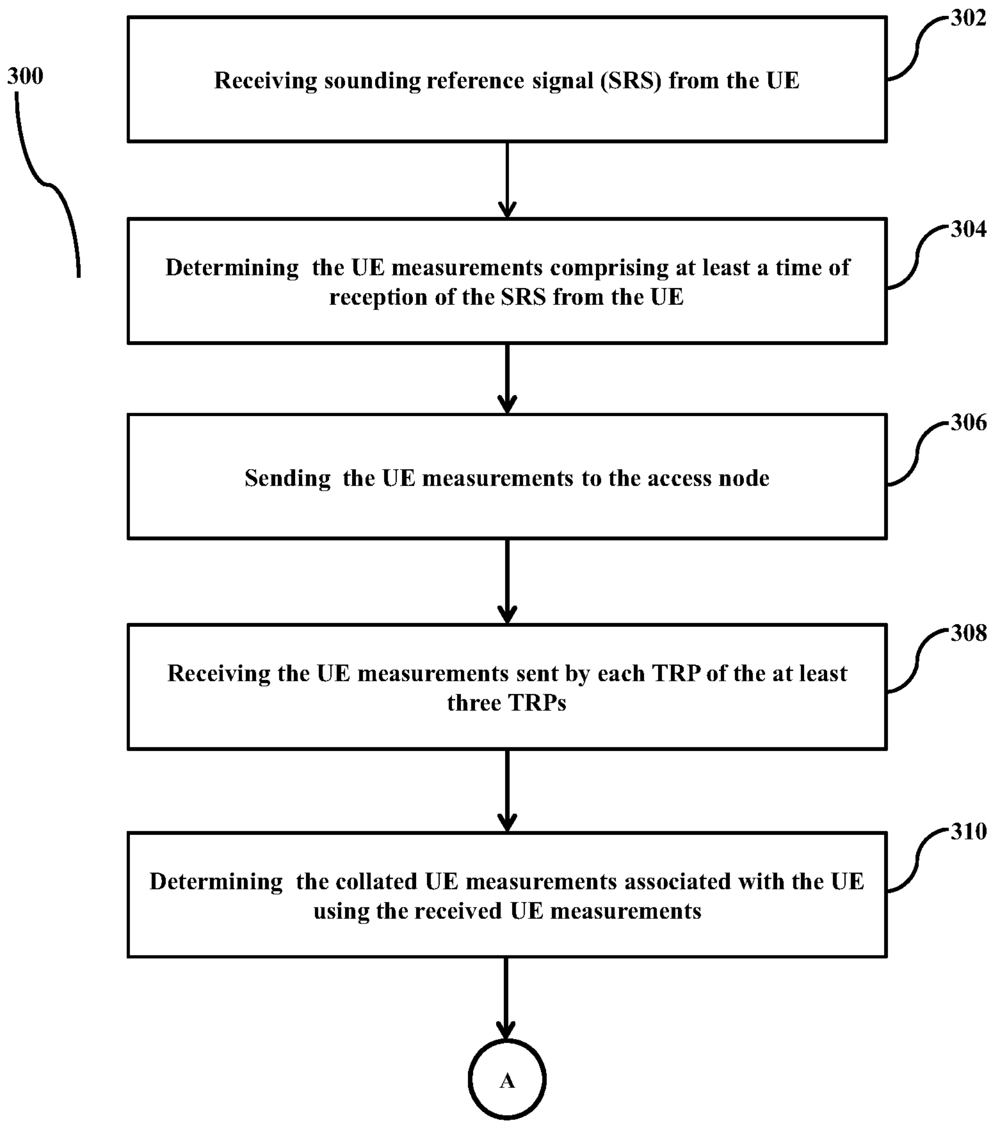
FIG. 3 is a flow diagram illustrating a method for predicting the location of the UE by the Near RT RIC in the wireless communication network, according to an embodiment as disclosed herein.
Figure 3:
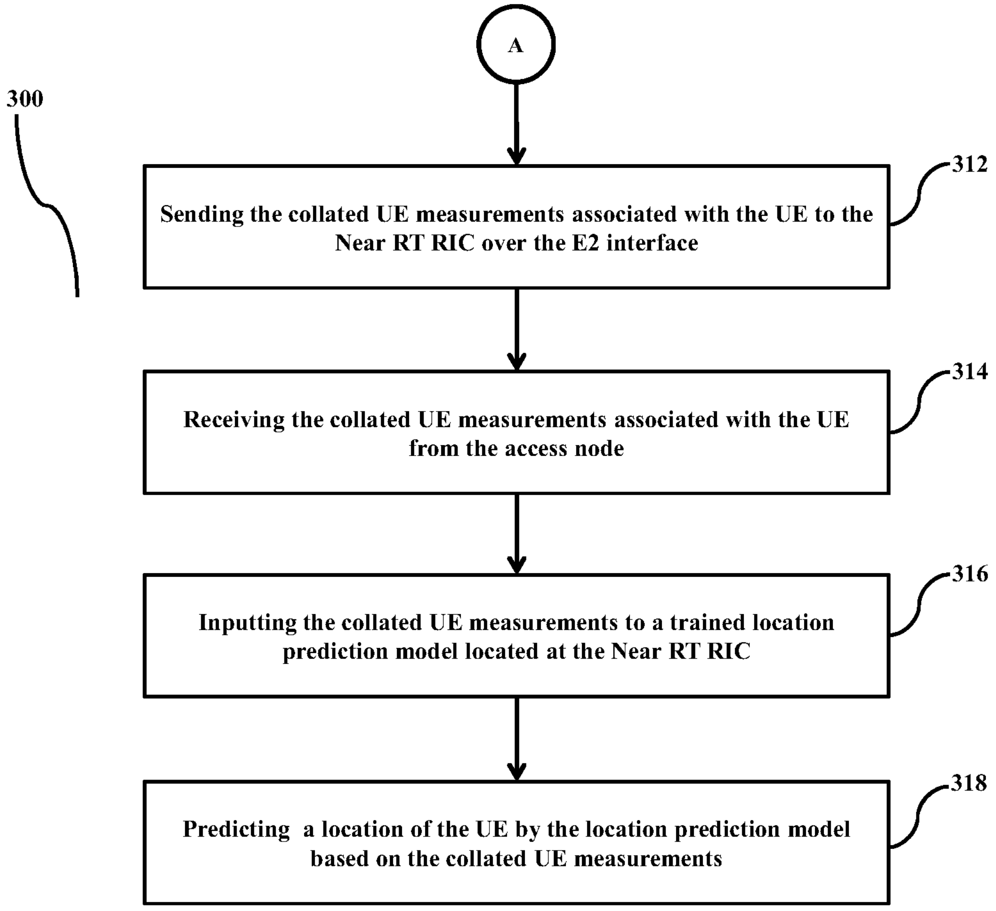

FIG. 3 is a flow diagram (300) illustrating a method for predicting the location of the UE (500) by the Near RT RIC (100) in the wireless communication network, according to an embodiment as disclosed herein.

Referring to the FIG. 3, at step 302 the method includes each TRP of the at least three TRPs (600*a-c*) receiving the SRS from the UE (500) and at step 304, determining the UE measurements comprising at least a time of reception of the SRS from the UE (500).

At step 306, the method includes each TRP of the at least three TRPs (600*a-c*) sending the UE measurements to the access node (1000).

At step 308, the method includes the access node (1000) receiving the UE measurements sent by each TRP of the at least three TRPs (600*a-c*) and at step 310, the method includes the access node (1000) determining the collated UE measurements associated with the UE (500) using the received UE measurements.

At step 312, the method includes the access node (1000) sending the collated UE measurements associated with the UE (500) to the Near RT RIC (100) over the E2 interface.

At step 314, the method includes the Near RT RIC (100) receiving the collated UE measurements associated with the UE (500) from the access node (1000).

At step 316, the method includes the Near RT RIC (100) inputting the collated UE measurements to the location prediction model (184) located at the Near RT RIC (100).

At step 318, the method includes the Near RT RIC (100) predicting the location of the UE (500) by the location prediction model (184) based on the collated UE measurements.

The various actions, acts, blocks, steps, or the like in the flow diagram (300) may be performed in the order presented, in a different order or simultaneously. Further, in some embodiments, some of the actions, acts, blocks, steps, or the like may be omitted, added, modified, skipped, or the like without departing from the scope of the invention.

Figure 4:
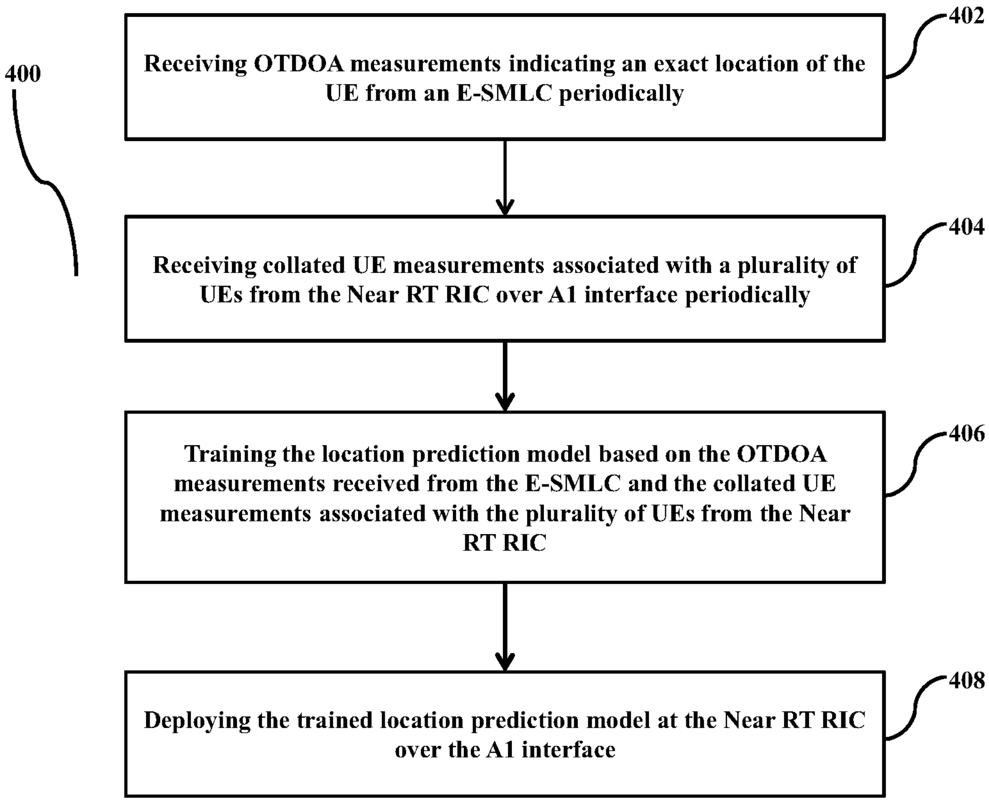
FIG. 4 is a flow diagram illustrating a method for training the location prediction model by the Non RT RIC in the wireless communication network, according to an embodiment as disclosed herein.

FIG. 4 is a flow diagram (400) illustrating a method for training the location prediction model (184) by the Non RT RIC (200) in the wireless communication network, according to an embodiment as disclosed herein.

Referring to the FIG. 4, at step 402 the method includes the Non-Real time RIC (200) receiving the OTDOA measurements indicating the exact location of the UE (500) from the E-SMLC (2000) periodically. For example, in the FIG. 2 illustrating the Non-Real time RIC (200), the OTDOA manager (282) is configured to receive the OTDOA measurements indicating the exact location of the UE (500) from the E-SMLC (2000) periodically.

At step 404, the method includes the Non-Real time RIC (200) receiving the collated UE measurements associated with the plurality of UEs (500*a*-N) from the Near RT RIC (100) over A1 interface periodically. For example, in the FIG. 2 illustrating the Non-Real time RIC (200), the UE measurement receiver (284) is configured to receive the collated UE measurements associated with the plurality of UEs (500*a*-N) from the Near RT RIC (100) over A1 interface periodically.

At step 406, the method includes the Non-Real time RIC (200) training the location prediction model (184) based on the OTDOA measurements received from the E-SMLC (2000) and the collated UE measurements associated with the plurality of UEs (500*a*-N) from the Near RT RIC (100). For example, in the FIG. 2 illustrating the Non-Real time RIC (200), the location prediction model manager (286) is configured to train the location prediction model (184) based on the OTDOA measurements received from the E-SMLC (2000) and the collated UE measurements associated with the plurality of UEs (500a-N) from the Near RT RIC (100).

At step 406, the method includes the Non-Real time RIC (200) deploying the trained location prediction model (184) at the Near RT RIC (100) over the A1 interface. For example, in the FIG. 2 illustrating the Non-Real time RIC (200), the location prediction model manager (286) is configured to deploy the trained location prediction model (184) at the Near RT RIC (100) over the A1 interface.

The various actions, acts, blocks, steps, or the like in the flow diagram (400) may be performed in the order presented, in a different order or simultaneously. Further, in some embodiments, some of the actions, acts, blocks, steps, or the like may be omitted, added, modified, skipped, or the like without departing from the scope of the invention.

Figure 5A:
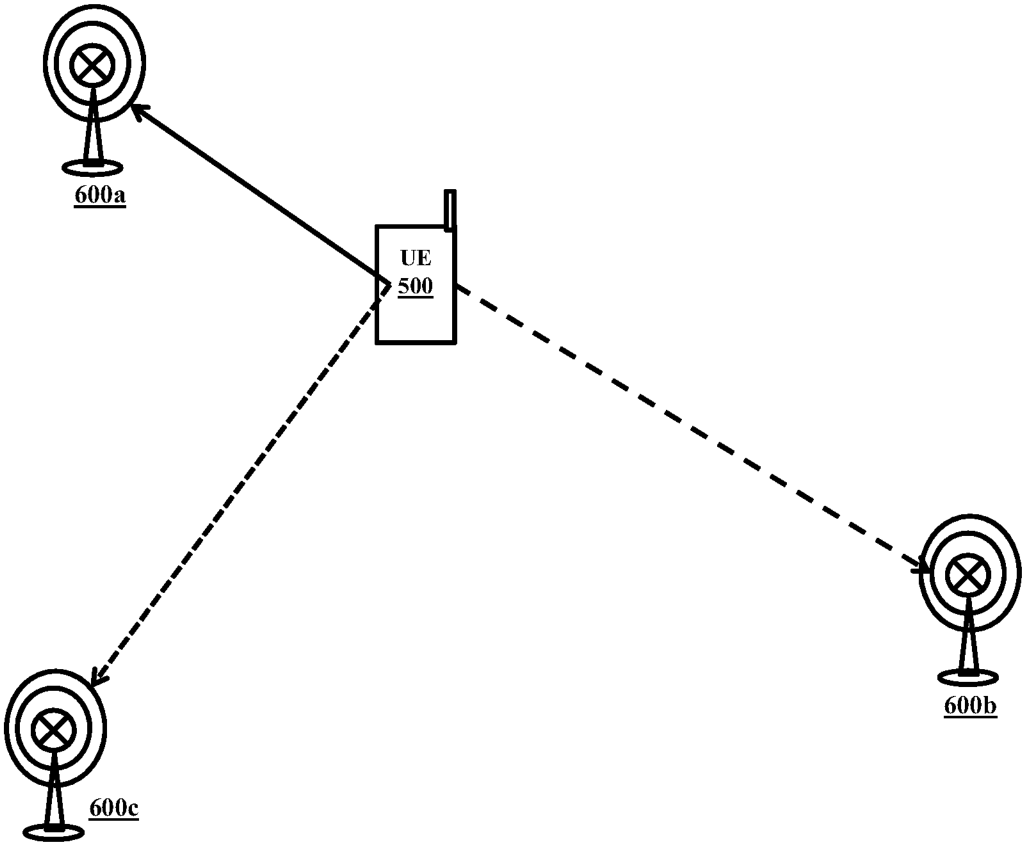
FIG. 5A is an example illustrating a transmission of SRS to multiple TRPs, according to an embodiment as disclosed herein.

FIG. 5A is an example illustrating the transmission of the SRS to multiple TRPs, according to an embodiment as disclosed herein.

Referring to the FIG. 5A, consider the wireless communication network which includes the UE (500) which is configured for the SRS transmission which is received and processed by multiple TRPs which are TRP1 (600a), TRP2 (600b) and TRP3 (600c). The wireless communication network also includes a base station or the access node (1000) which is connected to the multiple TRPs wirelessly and the UE (500) communicates with the access node (1000) via radio access air interface. Generally, channel sounding is a mechanism where the UE (500) transmits SRS signals on an uplink channel to enable the access node (1000) to estimate the uplink channel response. Periodic SRS signals can also be used for network-based positioning. In network-based positioning, when a network operator decides to identify the location of the UE (500), the UE position is estimated based on timing measurements of the SRS signals taken at LMUs, along with the knowledge of the geographical coordinates of the LMUs.

The primary TRP (600a) of the UE (500) receives the SRS and additionally spatially distributed TRPs (i.e., TRP2 (600b) and TRP3 (600c)) also receive the SRS from the UE (500). This would require coordination via a centralized scheduler and L1 implementation. The centralized scheduler and L1 must ensure that each TRP is instructed to receive SRS at the correct time.

In a multiple TRP system a single (centralized) L2 and L1 shall be implemented, with multiple transmission points that are spatially spread out to cover an area. The proposed method uses the uplink SRS from the UE (500) to locate a user which may be used to provide the location for various use cases such as health and emergency services.

If there are at least three TRPs that receive the same SRS then the UE's location can be estimated with some degree of accuracy using the received information. Here, a simplified form of LOS environment is considered. With a non-LOS environment triangulation would be based on similar concept but a bit more sophisticated.

Figure 5B:
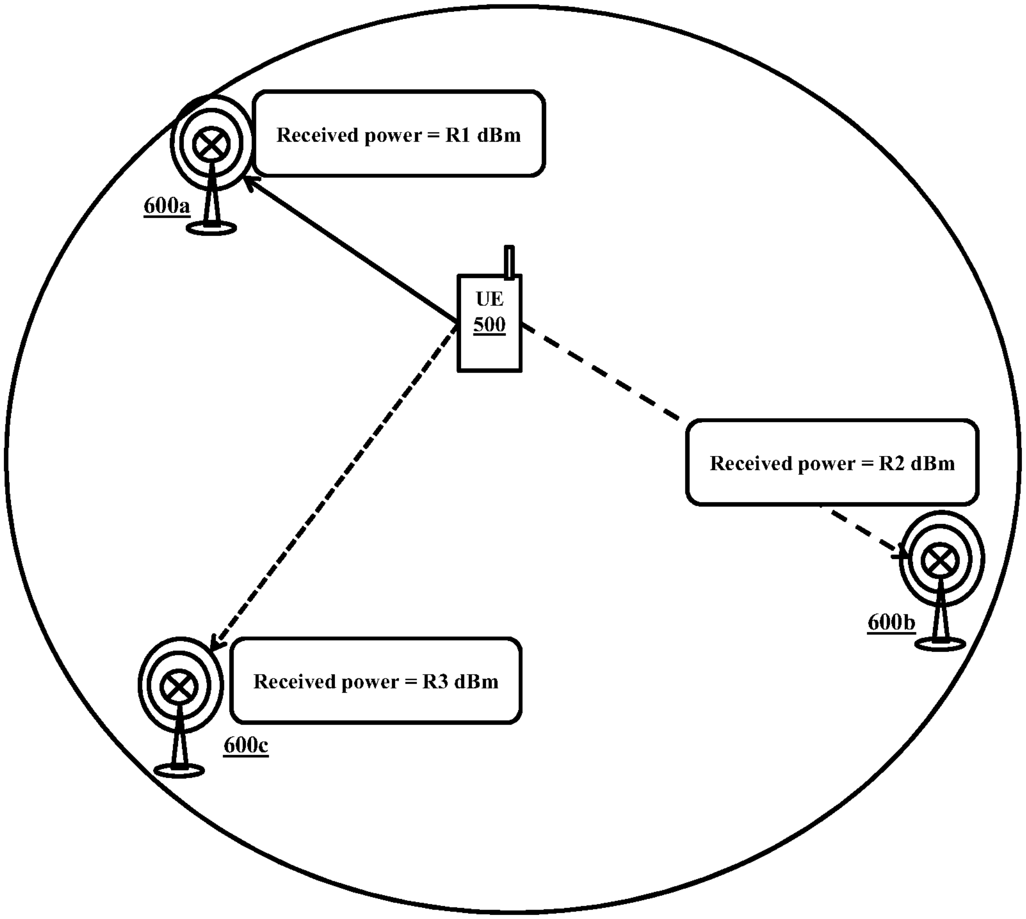
FIG. 5B is an example illustrating received power associated with the transmission of the SRS to the multiple TRPs, according to an embodiment as disclosed herein.

FIG. 5B is an example illustrating received power associated with the transmission of the SRS to the multiple TRPs, according to an embodiment as disclosed herein.

Referring to the FIG. 5B, the UE's SRS transmissions received power at each TRP is provided. The received SRS would have different signal strength also given different propagation delay associated with each path or the TRP. The same SRS sent by the UE (500) would be received at different time offsets i.e., t1, t2, t3 at the respective TRPs. The time offsets are used to estimate a circle of presence of the UE (500) as seen from each TRP.

The uplink SRS sent by the UE (500) and is received by the multiple TRPs. Each TRP estimates:

1) RSRP—i.e. received power of SRS
2) Time of reception (i.e. offset with slot boundary)
3) Angle of arrival (if feasible)

Figure 6:
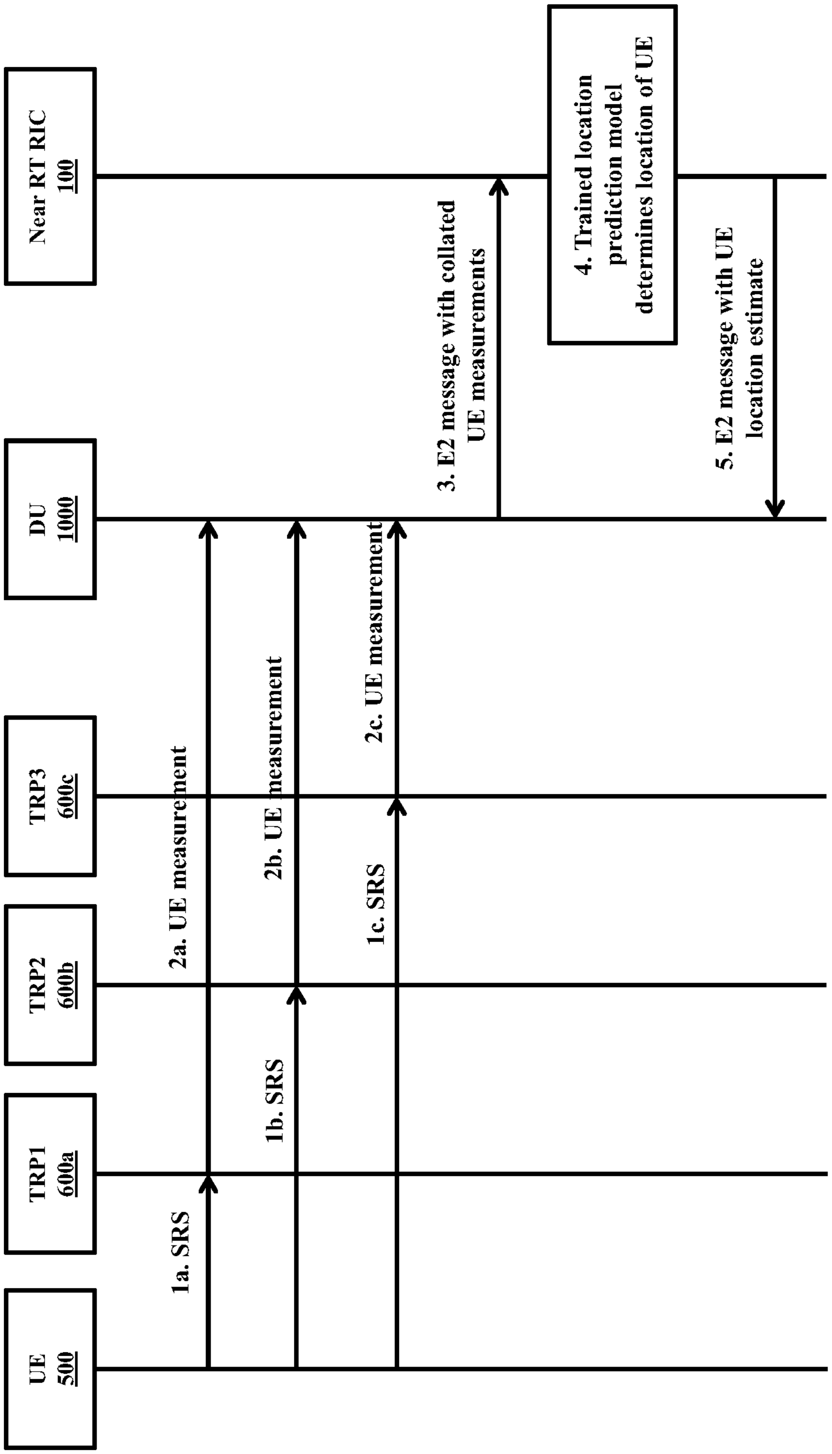
FIG. 6 is a signalling diagram for predicting the location of the UE by the Near RT RIC in the wireless communication network, according to an embodiment as disclosed herein.

FIG. 6 is a signalling diagram for predicting the location of the UE (500) by the Near RT RIC (100) in the wireless communication network, according to an embodiment as disclosed herein.

Referring to the FIG. 6, consider that the UE (500) is under the coverage of multiple TRPs which are TRP1 (600a), TRP2 (600b) and TRP3 (600c). At steps 1a-1c, the UE (500) sends the SRS to each of the TRP1 (600a), TRP2 (600b) and TRP3 (600c), respectively. Each of the TRP1 (600a), TRP2 (600b) and TRP3 (600c) uses the SRS received from the UE (500) to determine the UE measurements which may include the time of reception of the SRS at the respective SRS.

At steps 2a-2c, each of the TRP1 (600a), TRP2 (600b) and TRP3 (600c) sends the determined UE measurements to the DU (1000).

At step 3, the DU (1000) receives all the UE measurements and determines the collated UE measurements. Further, the DU (1000) sends the E2 message with the collated UE measurements to the Near RT RIC (100). The Near RT RIC (100) receives the E2 message with the collated UE measurements and at step 4, the Near RT RIC (100) runs the collated UE measurements through the trained location prediction model (184) and predicts the possible exact location of the UE (500). The prediction includes the distance from a primary TRP and angle from where UE's transmission was received at the primary TRP.

At step 5, the Near RT RIC (100) sends the E2 message with the predicted UE location to the DU (1000).

The proposal here suggests leveraging multiple TRPs and Non-Real time RIC and Near-Real time RIC for accurately locating users being serviced. In summary the following approach is suggested The predicted UE location can be used at the Near RT RIC (100) for various purposes such as for example but not limited to:

4) MU-MIMO User pairing
5) Handover decisions
6) Link adaptation
7) Interference management between neighbouring cells Further, the Near RT RIC (100) can use the E2 message to alter the policy or the configuration based on the location information of the UEs within the cell.

The DU (1000) specifically can utilize the location of the UE (500) for various uses such as:

1) Location aware MU-MIMO user paring—In multi-user MIMO UEs that are spatially apart are at times the best candidates to be scheduled in the same timeslot. This is because two independent beams which are spatially apart (in different directions) would not interfere (at least in LOS case)
2) Location aware Handover decisions-Currently access node can take handover decisions based on either signal strength or signal quality as measured and reported by the UE. However, if the access node as location information of the UE, then it can take factor that into the Handover decision.
3) Location aware scheduling-Users that are at cell edge can cause and also suffer from more interference from neighbouring cells. This can be avoided by utilizing soft frequency reuse like scheme where cell edge users are scheduled on different set of Radio resources than the neighbouring cell's edge users. The method suggested in this document can help eNodeB use UE location during scheduling process to mitigate interference.

The advantages of the proposed UE location prediction method over GPS based positioning is:

1. GNSS based positioning can drain UEs battery as UE shall be measuring GPS signals constantly.
2. Certain UE/users may not support GNSS based positioning This proposal can utilize a percentage of UEs in the cell for training i.e. those UEs shall report GNSS location data at certain intervals. While the remaining UEs shall work solely on SRS based location detection.

Figure 7:
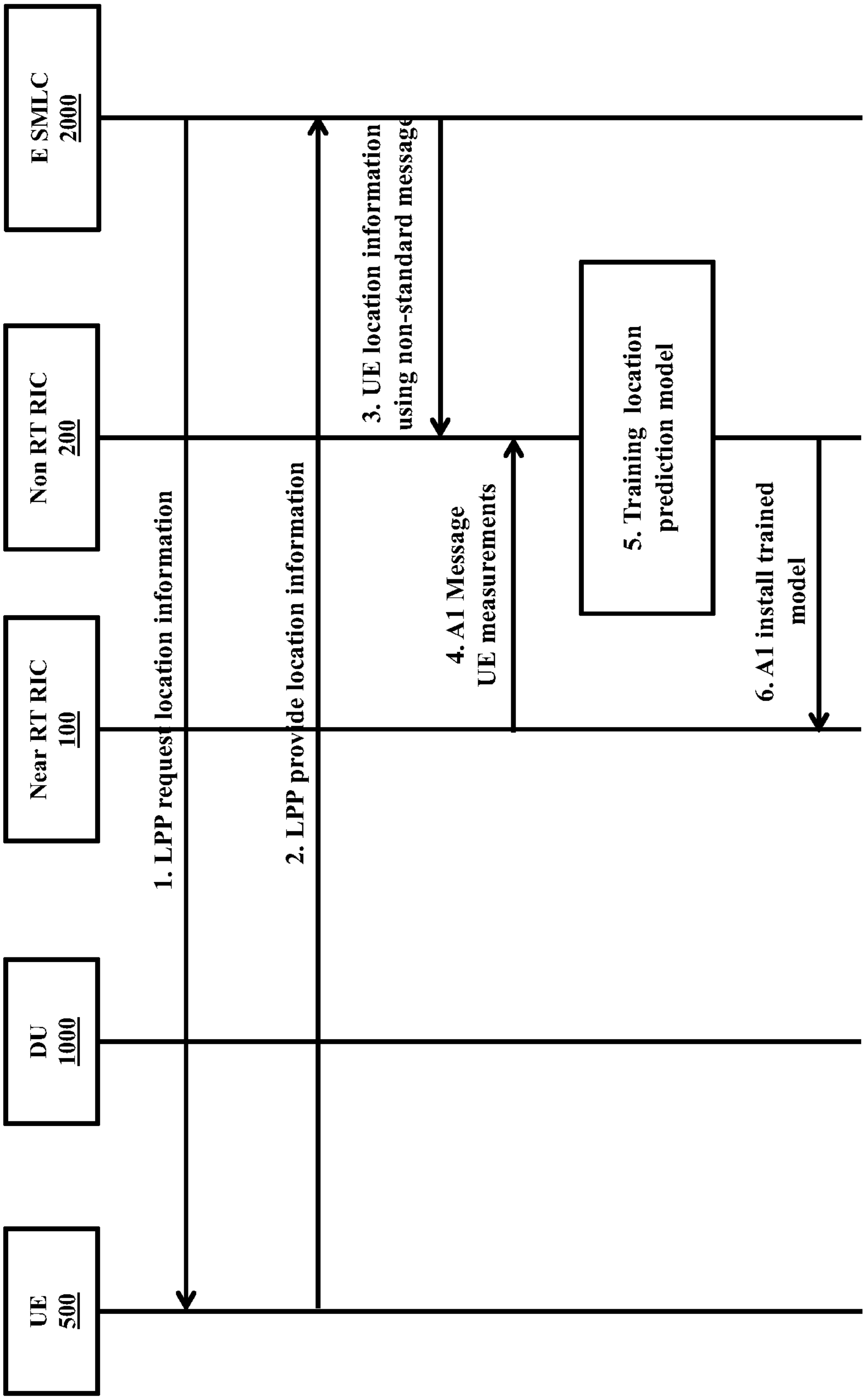
FIG. 7 is a signalling diagram for training the location prediction model by the Non RT RIC in the wireless communication network, according to an embodiment as disclosed herein.

FIG. 7 is a signalling diagram for training the location prediction model (184) by the Non RT RIC (200) in the wireless communication network, according to an embodiment as disclosed herein.

Referring to the FIG. 7, at step 1, the E SMLC (2000) sends a LPP request location information to the UE (500) and at step 2, the UE (500) sends the LPP provide location information to the E SMLC (2000).

At step 3, the E SMLC (2000) sends the UE location information using non-standard message to the Non RT RIC (200). Here, the exact UE location information may be determined using any existing location detection techniques such as using the GPS.

At step 4, the Non RT RIC (200) receives the A1 Message comprising the UE measurements related to the UE (500) from the Near RT RIC (100). Here, the UE measurements may be determined by an aperiodic SRS (ap-SRS) which is triggered by uplink grant via physical downlink control channel (PDCCH). Once triggered, the UE (500) transmits a sounding sequence in a pre-defined location. The Non-RT RIC (200) will also periodically get OTDA measurements to train and retrain the prediction model.

At step 5, the Non RT RIC (200) is training the location prediction model (184) and at step 6, the A1 installs the trained location prediction model (184) at the Near RT RIC (100). Here, the Non RT RIC (200) operates centrally on an operator's network, while the Near RT RIC (100) can be deployed centrally or on a network edge. The Non RT RIC (200) implementation communicates with Near RT RIC (100) elements in the RAN via the A1 interface. Using the A1 interface the Non RT RIC (200) facilitates provision of policies for individual UEs or groups of UEs; monitor and provide basic feedback on policy state from the Near RT RIC (100): provide enrichment information as required by the Near RT RIC (100); and facilitate ML model training, distribution and inference in cooperation with the Near RT RIC (100).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. A method for predicting a location of a user equipment (UE) (500) in a wireless communication network, wherein the method comprises:

receiving, by a Near-Real time RAN Intelligent Controller (Near RT RIC) (100), collated UE measurements associated with the UE (500), from an access node (1000) over an E2 interface, wherein the collated UE measurements are determined based on a plurality of UE measurements associated with the UE (500) sent by at least three transmission receipt points (TRPs) (600*a-c*) to the access node (1000);

inputting, by the Near RT RIC (100), the collated UE measurements to a location prediction model (184) located at the Near RT RIC (100); and predicting, by the Near RT RIC (100), a location of the UE (500) by the location prediction model (184) based on the collated UE measurements, wherein the location prediction model is trained by a Non RT RIC and deployed by the Non RT RIC at the Near RT RIC over an A1 interface, and wherein the method further comprises providing, by the Near RT RIC, the predicted location to the access node over the E2 interface, wherein the access node is a distributed unit (DU) and the predicted location is provided to the DU for location aware services of the DU.

2. The method as claimed in claim 1, wherein predicting the location of the UE (500) by the location prediction model (184) based on the collated UE measurements comprises predicting at least one of a distance from each TRP of the at least three TRPs (600*a-c*) and predicting an angle of reception of the SRS at each TRP of at least three TRPs (600*a-c*).

3. The method as claimed in claim 1, wherein receiving, by the Near RT RIC (100), the collated UE measurements associated with the UE (500), from the access node (1000) over the E2 interface comprises:

receiving, by each TRP of at least three TRPs (600*a-c*), sounding reference signal (SRS) from the UE (500);

determining, by each TRP of the at least three TRPs (600*a-c*), the UE measurements comprising at least a time of reception of the SRS from the UE (500);

sending, by each TRP of the at least three TRPs (600*a-c*), the UE measurements to the access node (1000);

receiving, by the access node (1000), the UE measurements sent by each TRP of the at least three TRPs (600*a-c*);

determining, by the access node (1000), the collated UE measurements associated with the UE (500) using the received UE measurements;

sending, by the access node (1000), the collated UE measurements associated with the UE to the Near RT RIC (100) over the E2 interface; and receiving, by the Near RT RIC (100), the collated UE measurements associated with the UE (500) from the access node (1000).

4. The method as claimed in claim 1, wherein the location prediction model (184) is trained by the Non-Real time RIC (200) by:

receiving, by the Non-Real time RIC (200), observed time difference of arrival (OTDOA) measurements indicating an exact location of the UE (500) from an Enhanced Serving Mobile Location Centre (E-SMLC) (2000) periodically;

receiving, by the Non-Real time RIC (200), collated UE measurements associated with a plurality of UEs (500*a*-N) from the Near RT RIC (100) over A1 interface periodically; and training, by the Non-Real time RIC (200), the location prediction model (184) based on the OTDOA measurements received from the E-SMLC (2000) and the collated UE measurements associated with the plurality of UEs (500a-N) from the Near RT RIC (100).

5. The method as claimed in claim 1, further comprises:

determining, by the Near RT RIC (100), at least one of a policy for the UE (500) and a configuration for the UE (500) based on location information of the UEs over the E2 interface.

6. A Near-Real time RAN Intelligent Controller (Near RT RIC) (100) for predicting a location of a user equipment (UE) (500) in a wireless communication network, wherein the Near RT RIC (100) comprises:

a memory (120);

a processor (140) coupled to the memory (120);

a communicator (160) coupled to the memory (120) and the processor (140); and a location management controller (180) coupled to the memory (120), the processor (140) and the communicator (160), and wherein the location management controller (180) is configured to:

receive collated UE measurements associated with the UE (500), from an access node (1000) over an E2 interface, wherein the collated UE measurements are determined based on a plurality of UE measurements associated with the UE (500) sent by at least three transmission receipt points (TRPs) (600a-c) to the access node (1000);

input the collated UE measurements to a location prediction model (184) located at the Near RT RIC (100); and predict a location of the UE (500) by the location prediction model (184) based on the collated UE measurements, wherein the location prediction model is trained by a Non RT RIC and deployed by the Non RT RIC at the Near RT RIC over an A1 interface, and wherein the location management controller is further configured to provide the predicted location to the access node over the E2 interface, wherein the access node is a distributed unit (DU) and the predicted location is provided to the DU for location aware services of the DU.

7. The Near RT RIC (100) as claimed in claim 6, wherein predicting the location of the UE (500) by the location prediction model (184) based on the collated UE measurements comprises predicting at least one of a distance from each TRP of the at least three TRPs (600a-c) and predicting an angle of reception of the SRS at each TRP of the at least three TRPs (600a-c).

8. The Near RT RIC (100) as claimed in claim 6, wherein the collated UE measurements associated with the UE (500) is generated by the access node (1000) using UE measurements sent by each TRP of the at least three TRPs (600a-c) connected to the UE (500) and wherein the UE measurements comprises at least a time of reception of the SRS from the UE (500).

9. The Near RT RIC (100) as claimed in claim 8, wherein the UE measurements is determined by each TRP of the at least three TRPs (600a-c) based on sounding reference signal (SRS) received from the UE (500) at each TRP of the at least three TRPs (600a-c).

10. The Near RT RIC (100) as claimed in claim 6, wherein the location management controller (180) is further configured to:

determine at least one of a policy for the UE (500) and a configuration for the UE (500) based on location information of the UEs over the E2 interface.

11. A Non-Real time RAN Intelligent Controller (Non RT RIC) (200) for training a location prediction model (184) in a wireless communication network, wherein the Non RT RIC (200) comprises:

a memory (220);

a processor (240) coupled to the memory (220);

a communicator (260) coupled to the memory (220) and the processor (240); and a model training controller (280) coupled to the memory (220), the processor (240) and the communicator (260), and wherein the model training controller (280) is configured to:

receive observed time difference of arrival (OTDOA) measurements indicating an exact location of a UE (500) from an Enhanced Serving Mobile Location Centre (E-SMLC) (2000) periodically;

receive collated UE measurements associated with a plurality of UEs (500a-N) from a Near RT RIC (100) over A1 interface periodically; and train a location prediction model (184) based on the OTDOA measurements received from the E-SMLC (2000) and the collated UE measurements associated with the plurality of UEs (500a-N) from the Near RT RIC (100).

12. The Non RT RIC as claimed in claim 11, wherein the model training controller (280) is further configured to:

deploy the location prediction model (184) at the Near RT RIC (100) over the A1 interface to predict a location of the UE (500) by the location prediction model (184) based on the collated UE measurements.

13. The Non RT RIC as claimed in claim 11, wherein the location prediction model (184) predicts the location of the UE (500) based on the collated UE measurements comprises predicting at least one of a distance from each TRP of at least three TRPs (600a-c) and predicting an angle of reception of the SRS at each TRP of at least three TRPs (600a-c).

* * * * *